March 8, 1960 C. L. ROBINSON ET AL 2,927,486
FEED ATTACHMENT FOR DRILLS
Filed July 10, 1956 4 Sheets-Sheet 1
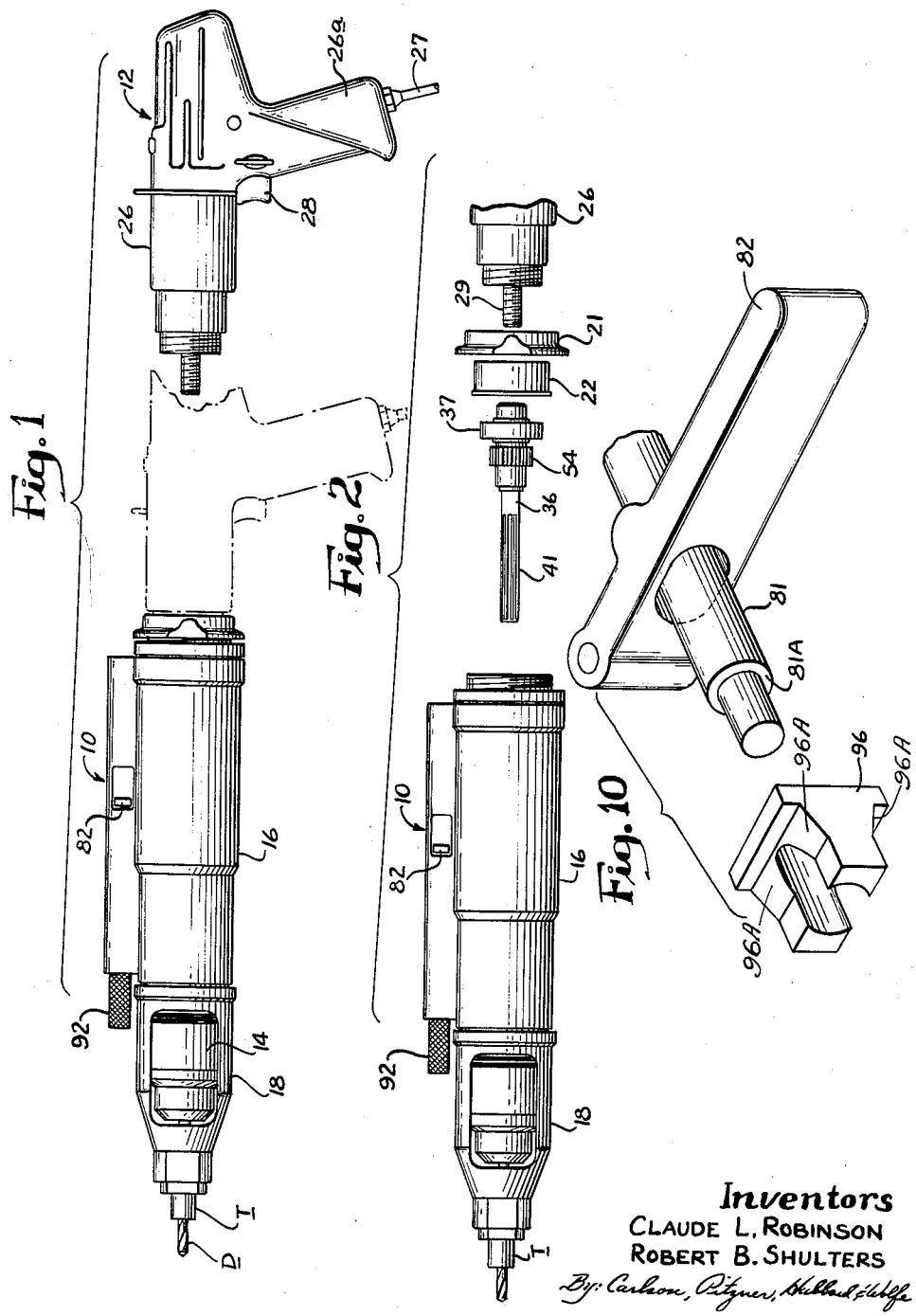
Inventors
CLAUDE L. ROBINSON
ROBERT B. SHULTERS
By Carlson, Pitzner, Hubbard & Wolfe
Attys.

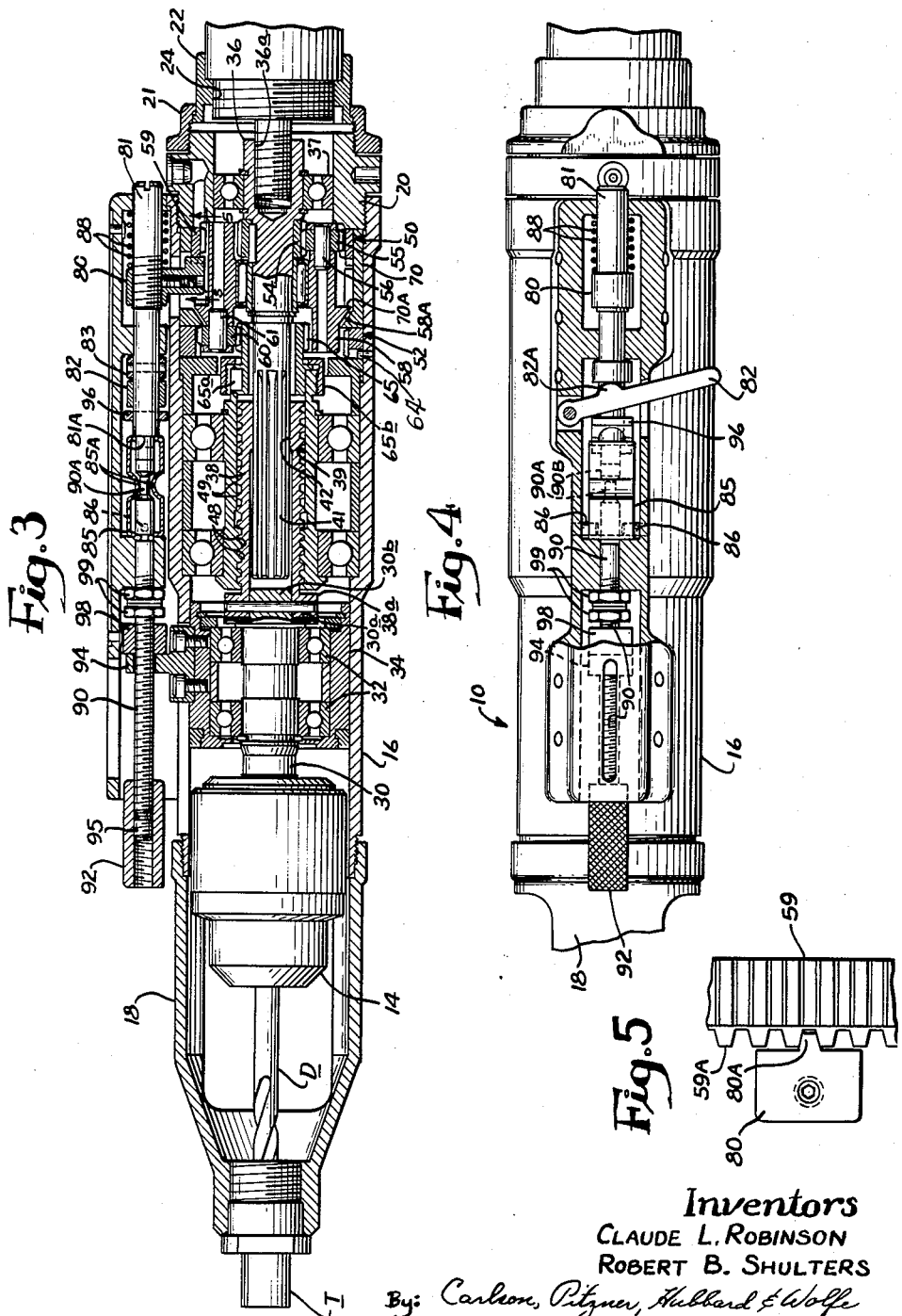

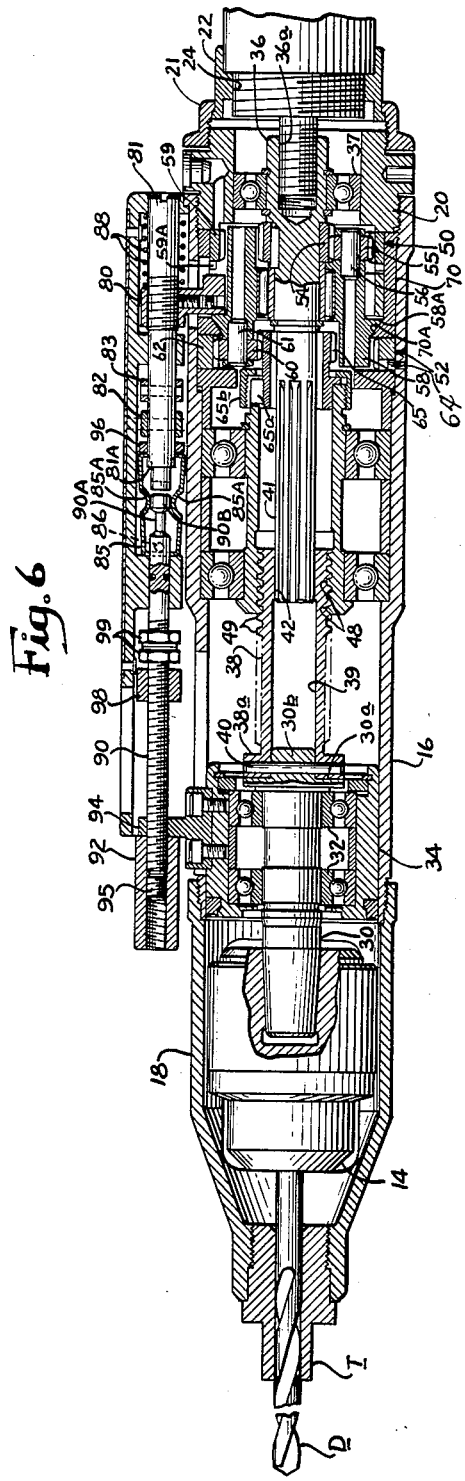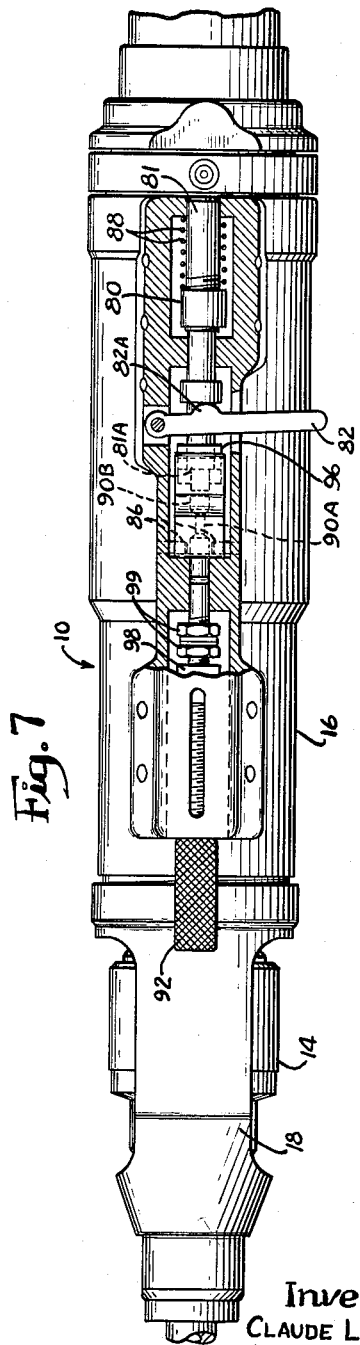

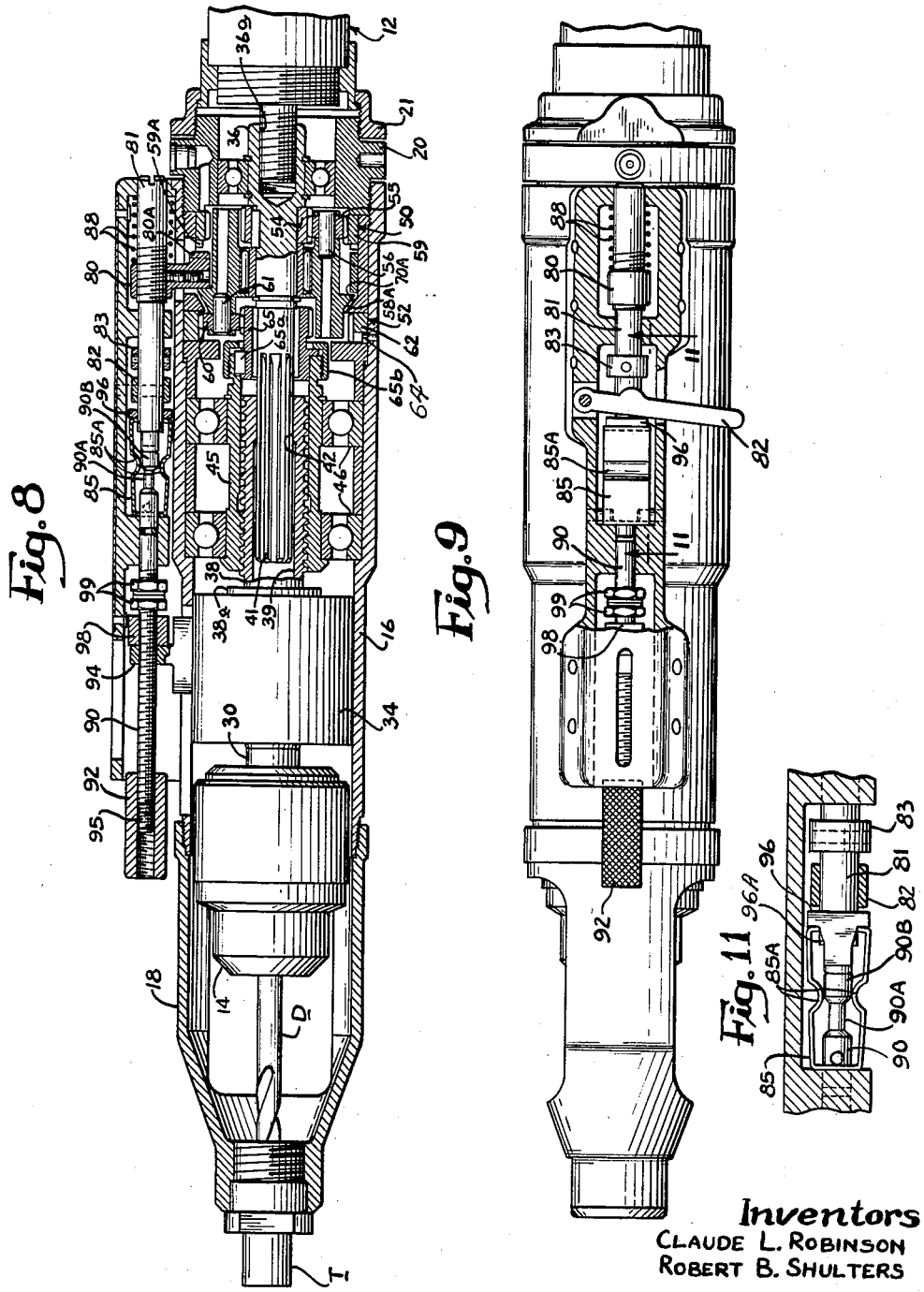

2,927,486

FEED ATTACHMENT FOR DRILLS

Claude L. Robinson and Robert B. Shulters, Spring Lake, Mich., assignors to Gardner-Denver Company, Quincy, Ill., a corporation of Delaware Application July 10, 1956, Serial No. 596,940

9 Claims. (Cl. 77—34.4)

The present invention relates generally to tools of the type intended for performing drilling and allied operations and more particularly to a device for effecting feed and return movements of a spindle mounted cutting element with respect to a workpiece.

It is the general object of the invention to provide a device for positively feeding and retracting a cutting tool which is readily adaptable for use with a power operated rotary driver and by means of which a cutting element such as a drill is fed toward a workpiece at a predetermined rate and thrust and is withdrawn therefrom.

A further and more specific object of the invention is to provide in a device for mounting a cutting element for rotary and for longitudinal movements an improved power transmission mechanism which derives power for effecting both the rotary and the longitudinal movement from the same rotary driver, which upon actuation imparts positive forward movement to the rotating cutting element, automatically effects return movement thereof, and automatically interrupts the application of power for effecting longitudinal movement at the end of the return stroke.

It is a related object to provide a cutting element feeding and retracting device in the form of an attachment for use in conjunction with hand-held drills or similar power operated rotary driving devices by means of which a cutting element such as a drill bit is supported for both rotary and longitudinal movement with respect to a workpiece and which attachment imparts to such a hand tool the advantages of automatic power operation yet which permits of economical manufacture.

The objects of the invention thus generally set forth, together with other objects and ancillary advantages, are attained by the construction and arrangement shown by way of illustration in the accompanying drawings, in which:

Figures 1 and 2 are exploded side elevational views of a spindle feeding device embodying the features of the present invention and intended for use with a hand drill.

Fig. 3 is a central longitudinal section through the device shown in the preceding views and illustrating component relationship for feed condition of operation.

Fig. 4 is a top plan view partly in section of the device as shown in Fig. 3.

Fig. 5 is a fragmentary bottom plan view taken substantially in the plane of line 5—5 in Fig. 3.

Fig. 6 is a sectional view similar to Fig. 3 but showing component relationship for return condition of operation.

Fig. 7 is a top plan view partly in section of the device as shown in Fig. 6.

Fig. 8 is a central longitudinal section similar to Figs. 3 and 6 but showing component relationship for neutral or dwell condition.

Fig. 9 is a top plan view partly in section of the device with the manual releasing mechanism operated to interrupt forward movement of the spindle.

Fig. 10 is an exploded perspective view of the latch means manual releasing mechanism.

Fig. 11 is a fragmentary sectional view, partly in elevation and on a somewhat enlarged scale, of the latching and release means showing the elements in the relative positions for interruption of the forward stroke of the device, and taken substantially in the plane of line 11—11 in Fig. 9.

While the invention is susceptible of various modifications and alternative constructions, there is herein shown and described in considerable detail a preferred embodiment. It is to be understood, however, that it is not intended to limit the invention to this specific embodiment, but it is intended to cover all modifications and alternative constructions falling within the spirit and scope of the invention as expressed in the appended claims.

In the practice of present day manufacturing, fabricating and assembling operations, so-called hand tools play an important role particularly because of their usually small size and portability which makes them readily usable in an almost infinite number of applications. They are especially useful in connection with the manufacture of aircraft, for example, where numerous design changes are more than frequent occurrences. So often are such changes effected that the design of permanent special purpose tools would become obsolete even before such tools could be built. Therefore, especially in the aircraft industry, the practice of using portable self-contained tools for performing drilling and allied operations in conjunction with readily fabricated and alterable jigs and fixtures has been adopted.

The use of manually supported hand tools is obviously fatiguing to the operators of such tools. Furthermore, it is difficult even for a fresh operator to impart to these tools a uniform force for feeding a cutting element carried by the tool into the work, and when an operator is required to exert considerable force on the tool in order to provide the necessary tip thrust, it is substantially impossible for the operator to maintain accuracy of alinement and to prevent a sudden lunge forward upon break-through. Particularly is this true in the case of drilling the relatively hard materials which are presently incorporated in modern aircraft.

Referring generally to the drawings, there shown is a device for feeding and retracting a cutting element such as a drill bit which uses the spindle of a power operated hand tool as a driver and is effective to mount the cutting element for rotary movement and for longitudinal movement, positively effected, at a predetermined feed rate. The illustrative device is in the form of an attachment 10 embodying the present invention and mounted in place on the forward end of a hand drill 12.

The attachment 10 is equipped with a suitable chuck 14 for mounting a cutting element, such as a drill or bit D. The device 10 includes a main housing 16 which is equipped at its forward end with a nose piece 18, within which the chuck 14 is disposed. The nose piece 18 is adapted to receive, at the outer or forward end thereof, a suitable drill bushing tip T. In this manner, the entire device permits of attachment to and support upon a jig or fixture, as may be required for use for the particular job to be accomplished. At its rear end, the housing 16 terminates in an adapter 20. The adapter 20, as shown, is screw-threaded into the rear end of the main housing 16 and serves to accommodate a lock nut 21, by means of which a flange nut 22 is secured to the housing. The flange nut 22 is complementally formed, as by the provision of internal threads 24, for the reception of the forward end portion of the hand drill 12. Such forward end portion of the hand drill, it will be apparent, may be the threaded outer end of the speed reduction gearing housing commonly included in such devices.

The hand drill 12, here chosen for purposes of illustration, is of the type intended for actuation by pressure fluid such as compressed air. As shown, it includes a body 26 within which a suitable rotary, pressure-fluid operated motor is housed. The body 26 terminates adjacent its rear end in a piston-grip type handle 26a, to which pressure fluid is supplied by a hose 27. The handle is equipped with a valve-operating trigger 28 by means of which the supply of pressure fluid to the tool is controlled. Output power is delivered by the hand drill 12 by way of a forwardly projecting spindle 29.

Referring particularly to Fig. 6, it will be seen that the chuck 14 which is housed within the nose piece 18 is mounted upon a spindle 30. The spindle 30 is rotatably supported in suitable anti-friction bearings 32 of the radial-thrust type. The bearings 32 are mounted in longitudinally spaced relation within a spindle housing 34. The spindle housing 34 is disposed within the forward end of the main housing 16 and is mounted for longitudinal movement with respect thereto.

Coaxially within the rear end portion of the main housing 16 is a drive shaft 36. The drive shaft 36 is rotatably mounted in an anti-friction bearing 37 which, in turn, is supported within the adapter 20. At its rear end, the drive shaft 36 is provided with a bore 36a which is suitably formed, as by internally threading, to receive the outer end of the spindle 29 of the hand drill 12.

Interposed between the drive shaft 36 and the spindle 30 is a feed or lead screw 38. The lead screw is of hollow or tubular construction having a bore 39 therethrough. At its outer end, the lead screw 38 is adapted to be non-rotatively connected with the rear end of the spindle 30. For this purpose, the rear end of the spindle is provided with a radial flange 30a of enlarged diameter and a coaxial rearwardly projecting boss 30b of reduced diameter. The forward end of the lead screw 38 is complementally formed and thus is provided with a radial flange 38a, which is adapted to bear against the flange 30a of the spindle 30; and the boss 30b is received at the forward end of the screw's bore 39. To insure maintenance of a non-rotative driving connection between the lead screw 38 and the spindle 30, the flange 38a and the boss 30b are diametrically apertured for the reception of a through-pin 40.

In order to provide a non-rotative driving connection between the drive shaft 36 and the lead screw 38, yet a connection which permits relative longitudinal movement therebetween, the drive shaft 36 is provided with longitudinally disposed external splines 41 and the lead screw 38 is provided, adjacent the rear end thereof, which similarly disposed and complementally formed internal splines 42.

From the foregoing, it will be apparent that rotation of the spindle 29 of the hand drill 12 is imparted directly to the drive shaft 36 and thence to the spindle 30, by way of the lead screw 38, to rotate the chuck 14 and the cutting element D mounted therein.

In conjunction with the lead screw 38, a positively driven lead screw sleeve 45 is utilized to effect longitudinal movement of the spindle 30, chuck 14 and the cutting element D carried thereby. As shown, the lead screw drive sleeve 45 is of tubular formation and is concentrically supported for rotation about the drive shaft 36 by radial-thrust type anti-friction bearings 46, disposed in spaced relation centrally of the housing 16. Adjacent its forward end, the lead screw drive sleeve is provided with an internal screw thread 48 for driving engagement with a complementally formed external thread 49 which extends the full length of the lead screw 38.

Interposed between the drive shaft 36 and the lead screw drive sleeve 45 is a power transmission which comprises a pair of planetary gear trains, generally designated 50 and 52, respectively, arranged in back-to-back relation with the planetary gear elements of each mounted for rotation on a common gear cage or carrier. As shown, the transmission includes a first or driving terminal gear 54 which is keyed directly to the drive shaft 36 and which meshes with planetary gear elements 55 disposed about the same. The planetary gear elements 55 are rotatably mounted on stub shafts 56 which are supported adjacent the rear end of a gear cage or carrier 58. The planetary gear elements 55 of the gear train 50 rotate within a ring gear 59. Adjacent the forward end of the carrier 58 are the planetary gear elements 60 of the gear train 52. These gear elements are supported on stub shafts 61, which shafts are also supported by the carrier 58. The planetary gear elements 60 rotate within a ring gear 62 which is non-rotatively held within the housing 16 by means of a pin 64. The planetary gear elements mesh with a second or driven terminal gear element 65. The gear element 65 is fixed to the rear end of the lead screw drive sleeve 45 as by a key 65a and lock nut 65b.

With the ring gear 59 of the gear train 50 held stationary, it will be apparent that rotation of the first terminal drive gear 54, so as to effect rotation of the planetary gears 55, results in rotation of the carrier 58. Thus the planetary gears 60 of the forward gear train 52 are rotated within the fixed ring gear 62 because of their mounting upon the carrier 58. As a result the driven terminal gear 65 is rotated. When the driven gear 65 is rotated, because of its rigid connection with the lead screw drive sleeve 45, the latter is also rotated. The change speed ratios of the gear trains 50 and 52 are so chosen that, under the foregoing conditions, with driving force transmitted from the drive shaft 36 by way of the transmission to the drive sleeve 45, the sleeve is rotated at a speed somewhat greater than the speed of rotation of the drive shaft 36 and in the same direction. Since the lead or feed screw 38 is directly coupled, the screw is rotated at a speed somewhat less than the speed of rotation of the driving sleeve 45. With the thread of the sleeve 45 and the threads of the screw 38 properly chosen with respect to the direction of rotation of the drive shaft, the rotational speed differential between the sleeve and the shaft under these conditions results in forward or feeding movement of the screw 38 with respect to the sleeve. Thus, the spindle 30 and its supporting housing 34 and the chuck 14 mounted thereon and the cutting element D carried thereby are fed forwardly.

To effect return movement of the spindle 30, its housing 34, the chuck 14 and cutting element D, the transmission is constructed and arranged to restrain rotation of the lead screw drive sleeve 45 so that it will be less than the speed of rotation of the feed screw 38 at which it is driven by the drive shaft 36. To this end, in the illustrative embodiment, the gear train 50 is constructed and arranged so that, in the return condition of operation, the transmission of driving force is interrupted. For this purpose, the ring gear 59 of the gear train 50 is adapted to be released to rotate freely. As shown, the ring gear 59 is concentrically mounted within a bushing 70 which is fixed within the housing 16 adjacent the rear end thereof. It will be apparent that, when released for rotation within the bushing 70, the ring gear 59 is rotated by the action of the planetary gear elements 55 thereon as the latter are driven by the driving terminal gear 54. Since the ring gear does rotate, no driving force is imparted to the gear cage 58. Because of friction, however, there may be a tendency for the planetary gear elements 55 and the carrier 58 to rotate. In order to restrain such movement, the carrier 58 and the stationary bushing 70 are provided with complementally tapered braking surfaces, respectively designated 58A and 70A, which are adapted to frictionally engage. Thus with the ring gear 59 free to rotate so that no driving force is imparted to the carrier 58, and with rotational movement of the carrier 58 restrained by frictional engagement between the surfaces 58A and 70A, then no driving force is imparted to the terminal driven gear 65, and rotational movement of the terminal gear 65 and the lead screw drive sleeve 45 is restrained. As a result, rotation of the lead screw 38 by the drive shaft 36 is effected at a speed greater than that of the lead screw drive sleeve 45. The lead screw, then, is telescoped into the lead screw drive sleeve so as to effect retraction or return movement of the spindle 30, its housing 34 and the chuck 14, and the cutting element D carried by the latter is withdrawn from the work.

In order to effect forward feeding movement of the spindle 30, the chuck 14 and the cutting element D, means is provided for locking the ring gear 59 of the gear train 50 in a stationary position so that the driving force, derived from the driving terminal gear 54 to rotate the planetary gears 55, is imparted to the carrier 58 and thence to the lead screw drive sleeve 45, by way of the planetary gears 60 and the driven terminal gear 65. As shown, this means includes a clutch block 80. The clutch block 80 is mounted on and fixed with respect to a latching rod 81, mounted for limited longitudinal movement in the top portion of the housing 16. The clutch block extends downwardly from the latching rod through a longitudinally disposed slot in the bushing 70. On its rear surface the block is provided with a tooth 80A for engagement with a series of teeth 59A formed upon the forward face of the ring gear 59. When the latching rod 81 is moved rearwardly with respect to the housing 16, the clutch block 80 which is fixed thereto is also moved rearwardly and, in its rearmost position, the tooth 80A engages the juxtaposed teeth 59A on the ring gear 59 so as to lock the same in place within the housing.

To shift the latching rod rearwardly the instant device is provided with a manually operable lever 82 which is pivoted at one end to the housing 16 and has, intermediate its ends, a cam lobe 82A for engagement with a collar 83 which is fixed upon the latching rod. It will be apparent, from Figs. 3 and 4, that rearward movement of the free end of the lever 82 produces a corresponding rearward movement of the latching rod 81 so as to carry the clutch block 80 rearwardly and the tooth 80A thereof into engagement with the teeth 59A of the ring gear.

Latching means is provided for releasably holding the rod 81 in its rearmost or forward feed position. As shown, this means includes a clip spring 85. The clip spring 85 is of generally C-shaped profile having downturned end portions which are adapted to engage a peripheral shoulder 81A adjacent the forward end of the rod 81. The clip spring 85 is so formed that it tends to grip the latching rod, and it is held in place in the housing 16 by pins 86. Thus upon rearward movement of the rod 81, by the lever 82 acting against the collar 83, the free ends of the clip spring drop in front of the shoulder 81A of the rod, as shown in Fig. 3, so as to hold the rod and the clutch block 80 in the rearmost position thereof with the tooth 80A of the clutch block engaged with the teeth 59A of the ring gear 59, thereby rendering operative the change-speed gearing to effect forward feeding movement of the spindle 30.

The latching rod 81 and the clutch block 80 are normally biased toward a forward or return position. For this purpose there is interposed between the clutch block and the rear wall of the housing 16 a spring 88. Conveniently the spring is of the helical compression type and is disposed about the rear end portion of the latching rod 81. Thus rearward movement of the rod 81 and block 80, by manual operation of the lever 82, serves to further compress the spring 88 in which condition it is held when the clip spring 85 is in engagement with the latching rod shoulder 81A.

Means is provided for limiting the forward stroke of the spindle 30 and for automatically initiating return movement thereof. As shown, this means includes a control rod 90 which is constructed and arranged to be moved, upon the attainment of the limit of the forward stroke of the spindle 30, so as to effect release of the latching rod to the action of the spring 88, whereby the latching rod and clutch block are moved forwardly to first disengage the teeth 80A and 59A and then to effect engagement of the braking surface 58A with the braking surface 70A, respectively, of the carrier 58 and stationary bushing 70. This action, as hereinbefore set forth, interrupts the application of driving force to the carrier and at the same time restrains rotation of the carrier to the end that rotation of the lead screw driving sleeve 45 is reduced below that of the lead screw 38 with the result that return movement of the spindle 30 is effected. As shown, the control rod 90 has screw-threaded on its outer end a stop nut 92 which is adapted to be engaged by an actuator 94. The actuator 94 is mounted upon the spindle bearing housing 34 for movement therewith. The stop nut 92 can be adjusted in its position upon the control rod and is adapted to be fixed in such position by means of a locking screw 95. Adjacent its rear end, the control rod 90 is relieved to define a portion 90A of reduced diameter and to define a head 90B for cooperation with the clip spring 85, so as to open or to permit closure of the clip spring depending upon the relative position of the control rod with respect thereto. As shown, the clip spring 85 is so formed intermediate its ends as to provide indented central portions 85A. In forward feed condition of operation of the device, as shown in Fig. 3, the control rod 90 is in its rearmost position and thus its relieved portion 90A is disposed between the indented portions 85A of the clip spring, thereby permitting the ends of the clip spring to come together for engagement with the shoulder 81A of the latching rod. In return condition of operation, as shown in Fig. 6, the control rod is moved forwardly with respect to the housing 16 and therefore with respect to the clip spring 85 so that the enlarged head portion 90B is disposed between the clip spring portions 85A thereby spreading the clip spring apart.

When the actuator 94 engages the stop nut 92, near the end of the forward stroke of the spindle 30, the stop nut and control rod are drawn forwardly from the position shown in Fig. 3 into the position shown in Fig. 6. Such movement results in the spreading apart of the clip spring 85 so that its end portions are withdrawn from engagement with the shoulder 81A. When this occurs, the latching rod 81 is released to the action of the compressed spring 88 so that the latching rod and the clutch block 80 are urged forwardly, and the clutch block 80 engages the carrier 58 so as to move the braking surface 58A into engagement with the braking surface 70A of the bushing 70, thereby to restrain rotation of the carrier 58, the lead screw driving gear 65 and the lead screw 45. Thus forward movement of the spindle 30 is interrupted and return movement thereof is initiated.

Desirably, provision is made for interrupting the forward stroke should occasion demand, as for example if the cutting element D should break or jam, at any point during the forward stroke of the spindle. For this purpose, means is provided for releasing the clip spring from engagement with the latching rod shoulder 81A, which means is operable at the will of the operator using the device. As shown, this means includes a release block 96 and the manually operable lever 82. The release block 96 is mounted upon the latching rod 81 for movement longitudinally with respect thereto. The forward face of the release block is provided with wedge surfaces 96A (Fig. 10) which are adapted to spread apart the rear end portions of the clip spring 85 upon forward movement of the release block with respect to the latching rod, when the lever 82 is moved forwardly (see Fig. 11). It will be apparent that such spreading of the clip spring 85 apart releases the latching rod 81 and clutch block 80 to the action of the spring 88 so that disengagement of the teeth 80A from the teeth 59A is effected, the ring gear 59 is freed and the carrier 58 is braked. Thus the application by the transmission mechanism of forward driving force is interrupted and return movement of the spindle is initiated as hereinbefore set forth.

To limit the return stroke, as shown in Fig. 8, the control rod 90 is equipped with a stop block 98 which is screw-threaded upon the control rod in spaced relation to the forward stop nut 92 and rearwardly of the actuator 94. It will be seen that during the return stroke of the spindle, and with it the actuator 94, the actuator moves along the control rod toward engagement with the stop block 98. Upon engagement with the stop block 98 the control rod is moved rearwardly so that the head 90B on the rear end thereof is moved into engagement with the outer or forward end of the latching rod 81. As this movement continues, the latching rod is moved rearwardly and with it the clutch block 80 is moved rearwardly. As a result the spring 88 is compressed slightly, and the force thereof that had been acting through the clutch block 80 to urge the braking surface 58A of the carrier 58 into engagement with the braking surface 70A of the bushing 70 is relieved. As soon as this braking force is relieved, no longer is rotation of the carrier 58, the planetary gears 60, the driving gear 65 and the return screw driving sleeve 45 restrained. Since rearward movement of the latching rod 81 and clutch block 80 was not sufficient to engage the clutch tooth 80A with the teeth 59A, then no driving force is imparted by way of the transmission to the lead screw driving sleeve. As a result the lead screw driving sleeve rotates with or at substantially the same speed as the lead screw 38. It will be apparent therefore that rearward or return movement of the spindle is interrupted and a dwell condition obtains.

To limit rearward movement of the control rod by the rearwardly moving actuator 94 the control rod is equipped with a pair of coacting nuts 99 which are adapted to engage the depending portion of the housing 16, in which the control rod is supported. When the control rod is thus repositioned, the relieved portion 90A thereof is in juxtaposition with the clip spring portions 85A. Thus, when the lever 82 is moved rearwardly by the operator to again initiate forward feed, the clip spring 85 is free to have its ends close into engagement with the forward end portion of the latching rod ahead of the shoulder 81A, so that the latching rod 81 is held in its rearmost position with the clutch block 80 in its feed or rearmost position, so as to lock the ring gear with respect to the housing whereby the transmission is rendered effective to impart a driving force therethrough to the lead screw driving sleeve 45, thereby to effect forward feed of the spindle 30, the chuck 14 and cutting element D.

It will be apparent from the foregoing that a device constructed in accordance with the teachings of the present invention is readily adaptable for use with any suitable power operated rotary driver, and particularly for use with a hand tool such a drill. By means thereof, a cutting element such as a drill bit can be fed toward a workpiece at a rate and thrust as predetermined by the ratios of the gearing included in the transmission in conjunction with the pitch of the threads of the lead screw and lead screw driving sleeve. For example, a feed rate of 0.002 of an inch per spindle revolution is effected with an over-all ratio of the two planetary gear trains of 1.032 to 1 driving a lead screw sleeve and lead screw having 16 threads per inch. If it is desired to increase the feed rate, this can be readily accomplished by simply replacing the 16-thread per inch sleeve and lead screw combination with one having a lesser number of threads per inch. Utilizing the same transmission gearing ratio a 10-thread per inch lead screw and lead screw sleeve combination will result in a feed rate of 0.0032 of an inch per spindle revolution.

The utilization of two planetary systems, one feeding into the other, provides a large gear reduction without unnecessarily fragile parts. Furthermore, the use of a friction device to restrain rotation of the planetary gear cage for the return stroke is especially advantageous because, in practice, it permits the achievement of relatively rapid return for all spindle speeds. For example, when the device is used in conjunction with a hand drill having a free spindle speed of 3000 r.p.m., there is sufficient slippage between the gear cage or carrier 58 and the bushing 70 when the device is in return condition to bring the spindle back very rapidly, yet without bringing it back so rapidly as to cause the lead screw and the lead screw sleeve to jam or to return into forward stroke condition due to inertia and momentum. At the same time, with a hand drill or other rotary driver having a slower speed of rotation, it has been found that almost the same rapid return rate is achieved because the friction forces operate to slow the rotation of the said screw driving sleeve with less slip.

Yet another practical advantage results from the foregoing construction. As hereinbefore pointed out, the spindle housing 34 is constructed and arranged to move longitudinally within the housing 16 with the spindle 30 as longitudinal movement thereof is effected by operation of the lead screw 38 and the lead screw sleeve 45. As a result, the chuck 14 and the cutting element D mounted therein are properly supported regardless of the position of the spindle with respect to the housing 16. In other words, there is no so-called spindle-overhang at the end of the forward stroke of the device.

We claim as our invention:

1. For use with a power-operated rotary driver, a device for feeding and retracting a cutting element comprising, in combination, a housing, a spindle for mounting the cutting element, means for supporting said spindle for longitudinal and rotary movement within said housing, a drive shaft mounted for rotary movement in said housing and adapted for connection to the driver for rotation thereby, a feed screw non-rotatively coupled to said spindle and to said drive shaft for drivingily connecting the same, a feed screw sleeve and drive means therefor interposed between said drive shaft and said feed screw for positively effecting longitudinal movement of said screw and spindle with respect to said shaft and housing, said drive means including a first terminal gear rigid with said drive shaft, a second terminal gear rigid with said sleeve and two planetary gear trains operatively connected therebetween, a carrier rotatably supporting the planetary gears of both trains, and control means having feed, return and neutral positions interposed between the ring gear of one of said trains and said carrier and operative in said feed and return positions to alternatively restrain rotation of said ring gear and said carrier for effecting rotation of said sleeve at rates faster and slower, respectively, than the rate of rotation of said screw to feed or return said spindle, and operative in said neutral position to restrain neither said ring gear nor said carrier so that said sleeve and screw rotate at substantially the same rate and no longitudinal spindle movement is effected.

2. For use with a power-operated rotary driver, a device for feeding and retracting a cutting element comprising, in combination, a housing, a spindle for mounting the cutting element, means for supporting said spindle for longitudinal and rotary movement within said housing, a drive shaft mounted for rotary movement in said housing and adapted for connection to the driver for rotation thereby, a feed screw non-rotatively coupled to said spindle and to said drive shaft for drivingily connecting the same, a feed screw sleeve and drive means therefor interposed between said drive shaft and said feed screw for positively effecting longitudinal movement of said screw and spindle with respect to said shaft and housing, said drive means including a first terminal gear rigid with said drive shaft, a second terminal gear rigid with said sleeve and two planetary gear trains operatively connected therebetween, a carrier rotatably supporting the planetary gears of both trains, and control means having feed, return and neutral positions interposed between the ring gear of one of said trains and said carrier and operative in said feed and return positions to alternatively restrain rotation of said ring gear and said carrier for effecting rotation of said sleeve at rates faster and slower, respectively, than the rate of rotation of said screw to feed or return said spindle, and operative in said neutral position to restrain neither said ring gear nor said carrier so that said sleeve and screw rotate at substantially the same rate and no longitudinal spindle movement is effected, and means interposed between said spindle supporting means and said control means for effecting movement of the latter between its positions in accordance with the longitudinal position of the spindle with respect to the housing.

3. In a power-operated spindle rotating and feeding device having a drive shaft drivingly connected to the spindle for rotating the same and having a lead screw and driving sleeve for feeding and retracting the spindle, the combination comprising a power transmitting mechanism interposed between the drive shaft and the driving sleeve and control means therefor for effecting sleeve rotation at rates greater than, less than, and substantially equal to the rate of rotation of the screw, said mechanism including a pair of planetary gear trains disposed in back-to-back relation with the ring gear of one train being rotatable, and said control means including a clutch block having a feed position in which it engages said ring gear for holding the same against rotation to effect transmission of power, and having a return position in which it frees said ring gear for rotation and impedes rotation of the sleeve, and further having an intermediate position in which said ring gear is free to rotate and sleeve rotation is unimpeded, said control means also including means for positioning said clutch block including a rod mounting said clutch block, means for moving said rod and said block into feed position, a latch engageable with said rod to retain the same and said clutch block in feed position, means operatively connected with the spindle for releasing said latch upon attainment of the feed stroke limit of the spindle, and a spring for moving said rod and clutch block from feed to return position, said latch releasing means engaging said rod near the end of the return stroke of the spindle for moving the same and said clutch block into the intermediate position thereof.

4. In a power-operated spindle rotating and feeding device having a drive shaft drivingly connected to the spindle for rotating the same and having a lead screw and driving sleeve for feeding and retracting the spindle, the combination comprising a power transmitting mechanism interposed between the drive shaft and the driving sleeve and control means therefor for effecting sleeve rotation at rates greater than, less than, and substantially equal to the rate of rotation of the screw, said mechanism including a pair of planetary gear trains with the ring gear of one train being rotatable and having the planetary gear cages of each train rigid with each other, said control means including a clutch having feed, return and intermediate positions interposed between said ring gear and said gear cage, means for holding said clutch in feed position to restrain rotation of said ring gear, means for releasing said clutch from feed position and urging the same into return position to release said ring gear for rotation and to impede rotation of said cage and the sleeve upon attainment by the spindle of the limit of its forward stroke, said last mentioned means urging said clutch from return position to intermediate position upon attainment of the limit of the return stroke to free said cage and interrupt longitudinal movement of the spindle.

5. In a power-operated spindle rotating and feeding device having a drive shaft drivingly connected to the spindle for rotating the same and having a lead screw and driving sleeve for feeding and retracting the spindle, the combination comprising a power transmitting mechanism interposed between the drive shaft and the driving sleeve and control means therefor for effecting sleeve rotation at rates greater than and less than the rate of rotation of the screw, said mechanism including a pair of planetary gear trains disposed in longitudinally spaced relation with the ring gear of the rearmost train being rotatable and having a unitary carrier for the planetary gears of both trains, said control means including a clutch block and a longitudinally movable rod mounting said clutch block between said ring gear and said carrier, a clip spring engageable with said rod for holding said clutch block in engagement with said ring gear to drive said carrier and sleeve to feed the spindle forwardly, a control rod engageable with said clip spring as an incident to the attainment of the forward stroke limit to release the same from engagement with said clutch mounting rod, a second spring for urging said mounting rod and clutch block forwardly to free said ring gear and to urge said clutch block into engagement with said carrier, means providing a braking surface engageable by said carrier upon engagement of the clutch block with said carrier to impede carrier rotation so as to interrupt driving of said sleeve and to effect return of the spindle.

6. In a power-operated spindle rotating and feeding device having a drive shaft drivingly connected to the spindle for rotating the same and having a lead screw and driving sleeve for feeding and retracting the spindle, the combination comprising a power transmitting mechanism interposed between the drive shaft and the driving sleeve and control means therefor for effecting sleeve rotation at rates greater than, less than, and substantially equal to the rate of rotation of the screw, said mechanism including a pair of planetary gear trains disposed in longitudinally spaced relation with the ring gear of the rearmost train being rotatable and having a unitary carrier for the planetary gears of both trains, said control means including a clutch block and a longitudinally movable rod mounting the same between said ring gear and said carrier, a clip spring engageable with said rod for holding said clutch block in engagement with said ring gear for driving said sleeve to feed the spindle forwardly, a control rod engageable with said clip spring as an incident to the attainment of the forward stroke limit to release the same from engagement with said clutch mounting rod, a second spring for urging said mounting rod and clutch block forwardly to free said ring gear and to urge said clutch block into engagement with said carrier, means providing a braking surface engageable by said carrier upon engagement of the clutch block with said carrier to impede carrier rotation so as to interrupt driving of said sleeve and to effect return of the spindle, said control rod being engageable with said supporting rod as an incident to the attainment of the return stroke limit to move the latter rod and clutch block rearwardly and the clutch block out of engagement with the carrier to free the latter so that the sleeve and screw can rotate together and longitudinal movement of the spindle is interrupted.

7. In a power-operated spindle rotating and feeding device having a drive shaft connected to the spindle for rotating the same and having screw means for feeding and returning the spindle, the combination comprising change-speed gearing driven from the drive shaft for operating said screw means and control means for said gearing including a clutch block having a feed position for effecting driving connection of said screw means and gearing to positively feed the spindle and having a return position for interrupting said driving connection and for effecting positive return of the spindle by the screw means, said control means including a rod mounting said clutch block, a lever for moving said mounting rod and block into feed position, latch means for holding said rod and block in feed position, a control rod engageable with said latch means, a control rod engageable with said mounting rod, an actuator moveable with the spindle and engageable with said control rod for moving the control rod into engagement with said latch means to release the same upon attainment by the spindle of its forward stroke limit, and a spring for urging said mounting rod and clutch block into return position upon release of said latch means, said actuator also being engageable with said control rod upon attainment by the spindle of its return stroke limit for moving the control rod into engagement with said mounting rod to move the same and said clutch block against the action of said spring into a position intermediate its feed and return positions so as to interrupt longitudinal movement of said spindle by said screw means and gearing.

8. In a power-operated spindle rotating and feeding device having a drive shaft connected to the spindle for rotating the same and having screw means for feeding and returning the spindle, the combination comprising change-speed gearing driven from the drive shaft for operating said screw means, and control means for said gearing including a clutch block having a feed position for effecting driving connection of said screw means and gearing to positively feed the spindle and having a return position for interrupting said driving connection and for effecting positive return of the spindle by the screw means, said control means including a rod mounting said clutch block, a lever for moving said mounting rod and block into feed position, latch means for holding said rod and block in feed position, a control rod engageable with said latch means and with said mounting rod, an actuator movable with said spindle and engageable with said control rod for moving the control rod into engagement with said latch means to release the same upon attainment by the spindle of its forward stroke limit, and a spring for urging said mounting rod and clutch block into return position upon release of said latch means, said actuator also being engageable with said control rod upon attainment by the spindle of its return stroke limit for moving the control rod into engagement with said mounting rod to move the same and said clutch block against the action of said spring and into a position intermediate its feed and return positions so as to interrupt longitudinal movement of said spindle by said screw means and gearing, and means operable by said lever to operate said latch means to release said mounting rod and clutch block to the action of said spring so as to interrupt feeding movement and to effect return movement at any desired point during the forward stroke of the spindle.

9. In a power-operated spindle rotating and feeding device having a drive shaft connected to the spindle for rotating the same and having screw means for feeding the spindle, the combination comprising change speed gearing driven from the drive shaft for operating said screw means, a clutch block having feed, return and neutral positions, means for moving said clutch block to said feed position for rendering effective a driving connection between said gearing and said screw means to feed said spindle, a latch for holding said block in feed position, a spring biasing said block in a direction away from said feed position, means for releasing said latch to release said block to the action of said spring for moving said clutch block to said return position for rendering said driving connection ineffective and for restraining a portion of said screw means to return said spindle, and means for moving said clutch block to said neutral position for rendering said driving connection and said restraining means ineffective to feed or return said spindle.

References Cited in the file of this patent

UNITED STATES PATENTS 2,777,339     Hess _____ Jan. 15, 1957

FOREIGN PATENTS 26,852     Great Britain _____ 1913